US008271724B1

(12) United States Patent
Scott et al.

(10) Patent No.: US 8,271,724 B1
(45) Date of Patent: Sep. 18, 2012

(54) CONTROLLING WRITE REQUEST ACCESS TO A NON-VOLATILE LOG

(75) Inventors: John A. Scott, Cary, NC (US); Darrell Suggs, Raleigh, NC (US); Eric Hamilton, Durham, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 1026 days.

(21) Appl. No.: 12/077,366

(22) Filed: Mar. 17, 2008

Related U.S. Application Data

(63) Continuation of application No. 11/157,227, filed on Jun. 20, 2005, now Pat. No. 7,370,143.

(51) Int. Cl.
*G06F 17/40* (2006.01)
(52) U.S. Cl. ........ 711/113; 711/161; 711/162; 711/170; 711/173; 707/644; 707/648
(58) Field of Classification Search .................. 711/113, 711/161, 162, 170, 173; 707/644, 648
See application file for complete search history.

(56) References Cited

U.S. PATENT DOCUMENTS

| | | | | |
|---|---|---|---|---|
| 6,865,647 B2 * | 3/2005 | Olarig et al. | ........ | 711/129 |
| 6,892,211 B2 * | 5/2005 | Hitz et al. | ........ | 1/1 |
| 7,191,284 B1 * | 3/2007 | Gupta et al. | ........ | 711/114 |
| 7,249,150 B1 * | 7/2007 | Watanabe et al. | ........ | 1/1 |
| 7,299,379 B2 * | 11/2007 | Royer et al. | ........ | 714/20 |
| 7,370,143 B1 * | 5/2008 | Scott et al. | ........ | 711/113 |
| 2003/0182322 A1 * | 9/2003 | Manley et al. | ........ | 707/201 |
| 2004/0143707 A1 * | 7/2004 | Olarig et al. | ........ | 711/129 |
| 2005/0125606 A1 | 6/2005 | Garney | | |
| 2005/0246487 A1 | 11/2005 | Ergan et al. | | |

* cited by examiner

*Primary Examiner* — Yaima Campos
*Assistant Examiner* — Samuel Dillon
(74) *Attorney, Agent, or Firm* — Blakely, Sokoloff, Taylor & Zafman LLP

(57) ABSTRACT

In one embodiment of the present invention, a method and system are provided to control access to the non-volatile log (NVlog) of a storage server. By controlling access to the NVLog of a storage server the relative disk write bandwidth available to different client write requests can be controlled. The incoming write request can be categorized, and, during times of heavy load, only be permitted to use NVLog space as permitted based on the categorization of each write request. In one embodiment, the present invention includes receiving a write request from a client at a storage server, and determining whether the received write request can be presently logged in a NVlog based on a category of the write request.

13 Claims, 8 Drawing Sheets

CONTROLLING WRITE REQUEST ACCESS TO A NON-VOLATILE LOG

RELATED APPLICATIONS

The present patent application is a Continuation of application Ser. No. 11/157,227, filed Jun. 20, 2005 now U.S. Pat. No. 7,370,143 entitled "Controlling Write Request Access to a Non-Volatile Log."

FIELD OF THE INVENTION

At least one embodiment of the present invention pertains to storage servers, and more particularly, to write request processing in a storage server.

BACKGROUND

In modern computer networks, a storage server can be used for many different purposes, such as to provide multiple users with access to shared data or to back up mission critical data. A file server is an example of a storage server which operates on behalf of one or more clients to store and manage shared files in a set of mass storage devices, such as magnetic or optical storage based disks or tapes. The mass storage devices are typically organized into one or more volumes of Redundant Array of Independent (or Inexpensive) Disks (RAID).

One mode in which a file server can be used is a network attached storage (NAS) mode. In a NAS mode, a file server can be implemented in the form of an appliance, called a filer, that attaches to a network, such as a local area network (LAN) or a corporate intranet. An example of such an appliance is any of the Filer products made by Network Appliance, Inc. in Sunnyvale, Calif. A storage server can also be employed in a storage area network (SAN), which is a highly efficient network of interconnected, shared storage devices. In a SAN, the storage server (which may be an appliance) provides a remote host with block-level access to stored data, whereas in a NAS configuration, the storage server provides clients with file-level access to stored data.

Some storage servers, such as certain Filers from Network Appliance, Inc. are capable of operating in either a NAS mode or a SAN mode, or even both modes at the same time. Such dual-use devices are sometimes referred to as "unified storage" devices. A storage server such as this may use any of various protocols to store and provide data, such as Hypertext Transport Protocol (HTTP), Network File System (NFS), Common Internet File system (CIFS), Internet SCSI (ISCSI), and/or Fibre Channel Protocol (FCP).

A simple example of a storage file server is illustrated in FIG. 1. A storage server located at the primary site is coupled locally to a set of mass storage devices 4, and to a set of clients 1 through a network 3, such as a local area network (LAN). Each of the clients 1 may be, for example, a conventional personal computer (PC), workstation, or the like. The mass storage devices 4 may be, for example, conventional magnetic disks, optical disks such as CD-ROM or DVD based storage, magneto-optical (MO) storage, or any other type of non-volatile storage devices suitable for storing large quantities of data.

The storage server 2 receives and responds to various read and write requests from the clients 1. In a system which handles large volumes of client requests, it may be impractical to save data modifications to the mass storage devices 4 every time a write request is received from a client 1. The reason is that disk accesses tend to take a relatively long time compared to other operations. Therefore, the storage server 2 may instead hold write requests in memory temporarily and only periodically save the modified data to the mass storage devices 4, such as every 5 to 10 seconds. The event of saving the modified data to the mass storage devices is called a "consistency point". At a consistency point, the storage server saves any data that was modified by the write requests to its local mass storage devices 4.

In this approach, there is a small risk of a system failure occurring between consistency points, causing the loss of data modified after the last consistency point. Consequently, in at least one prior art solution, the storage server 2 includes a non-volatile random access memory (NVRAM) in which it maintains a log of write requests received from clients since the last consistency point. This log is referred to as the "NVLog". The NVLog includes a separate entry for each write request received from a client 1 since the last consistency point. Each NVLog entry includes the data to be written according to the corresponding request. The NVLog is only used in the event of a failure, to recover data that would otherwise be lost. In the event of a failure, it may be possible to replay the NVLog to reconstruct the current state of stored data just prior to the failure. After each consistency point is completed, the NVLog is cleared and started anew.

FIG. 2 is a block diagram showing the architecture of a storage server 2 known in the prior art. The storage server 2 includes one or more processors 21 and a system memory 22 coupled to each other by a north bridge. The north bridge 28 is also coupled to a Peripheral Component Interconnect (PCI) bus 23. The north bridge 28 provides an interface between peripheral components on the PCI bus and the processors 21 and system memory 22.

Each processor 21 is a central processing unit of (CPU) of the storage server 2 and, thus, controls the overall operation of the storage server 2. In certain embodiments, a processor 21 accomplishes this by executing software stored in system memory 22. Such software may include the operating system 24 of the storage server 2. Each processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The system memory 22 is a random access memory (RAM) which stores, among other things, the operating system 24 of the storage server 2, in which the techniques introduced herein can be implemented.

Connected to the PCI bus 23 are an NVRAM 29, which stores the NVLog of the storage server 2; one or more internal mass storage devices 25; a storage adapter 26; a network adapter 27; and a cluster interconnect adapter 30. Internal mass storage devices 25 may be or include any conventional medium for storing large volumes of data in a non-volatile manner, such as one or more disks. The storage adapter 26 allows the storage server 2 to access the external mass storage devices 4 and may be, for example, a Fibre Channel adapter or a SCSI adapter. The network adapter 27 provides the storage server 2 with the ability to communicate with remote devices such as the clients 1 over a network and may be, for example, an Ethernet adapter. The cluster interconnect adapter 30 provides the storage server 2 with the ability to connect the storage server to other storage servers in a cluster configuration.

One problem with the system described above, is that during consistency point processing, the NVlog may become full during heavy loads. If the NVlog is full, no further write requests can be acknowledged until the NVLog is cleared when the consistency point processing is completed. This adds latency to applications using the storage server.

For some applications, the added latency is of little concern. For example, employee home directories of an enterprise can slow down without any significant harm to the enterprise. However, for other applications, the added latency can cost the enterprise money. For example, a mission critical database, such as a customer service database, experiencing latency can hurt the enterprise in financial terms because the customer service representatives will handle fewer customers. What is needed is a file server that can differentiate between various applications when heavily loaded.

SUMMARY

In one embodiment of the present invention, a method and system are provided to control access to the non-volatile log (NVlog) of a storage server. By controlling access to the NVLog of a storage server the relative disk write bandwidth available to different client write requests can be controlled. The incoming write request can be categorized, and, during times of heavy load, only be permitted to use NVLog space as permitted based on the categorization of each write request. In one embodiment, the present invention includes receiving a write request from a client at a storage server, and determining whether the received write request can be presently logged in a NVLog based on a category of the write request. Other aspects of the invention will be apparent from the accompanying figures and from the detailed description that follows.

BRIEF DESCRIPTION OF THE DRAWINGS

One or more embodiments of the present invention are illustrated by way of example and not limited to the figures of the accompanying drawings, in which like references indicate similar elements and in which.

DETAILED DESCRIPTION

In one embodiment of the present invention, a method and system are provided to control access to the NVLog of a storage server. By controlling access to the NVLog of a storage server the relative disk write bandwidth available to different client write requests can be controlled. The incoming write request can be categorized, and, during times of heavy load, only be permitted to use NVLog space as permitted based on the categorization of each write request. These and other features of the present invention will be described further below.

Figure 1:
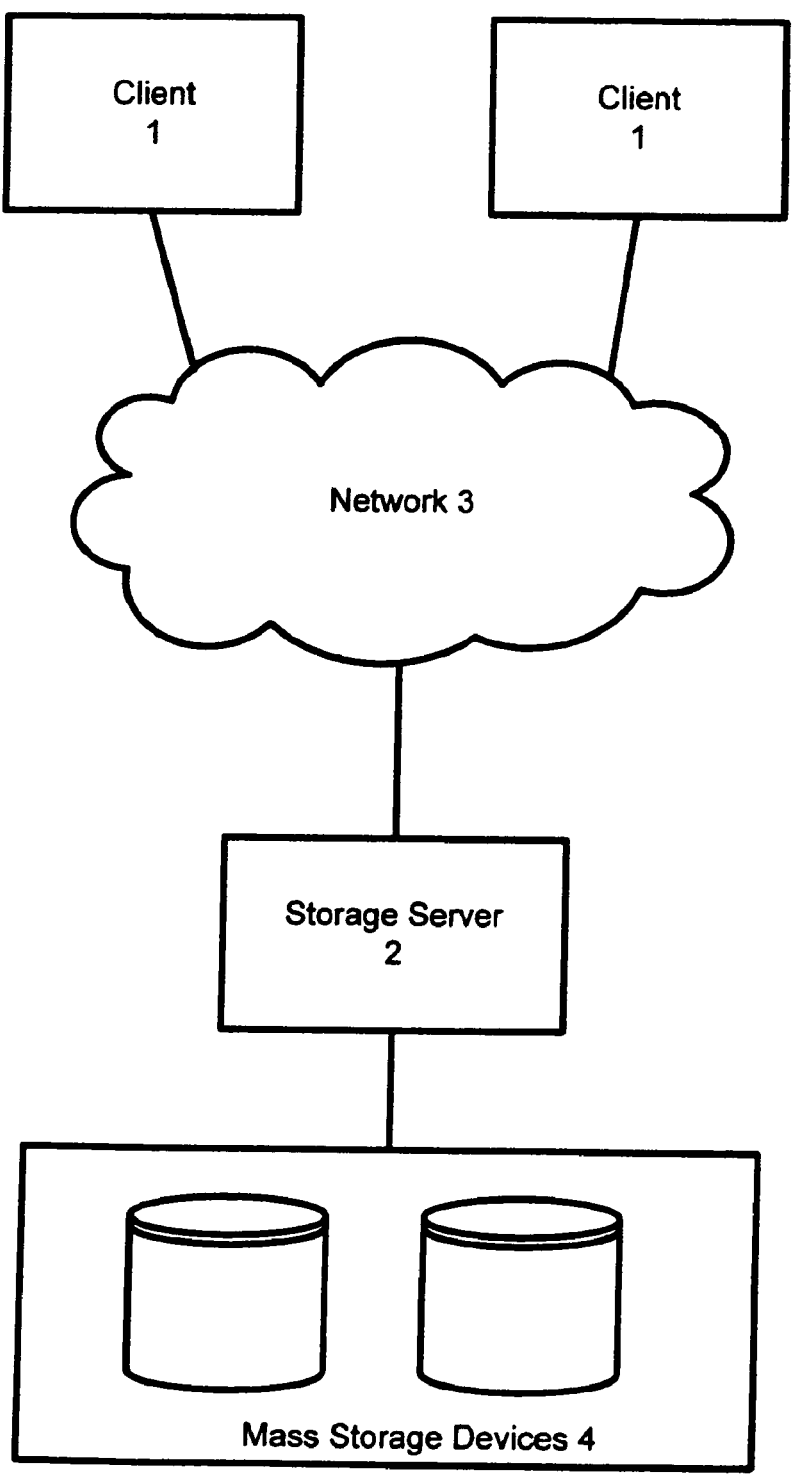
FIG. 1 is a schematic block diagram of an environment including a storage server that may be used with one embodiment of the present invention.
Figure 2:
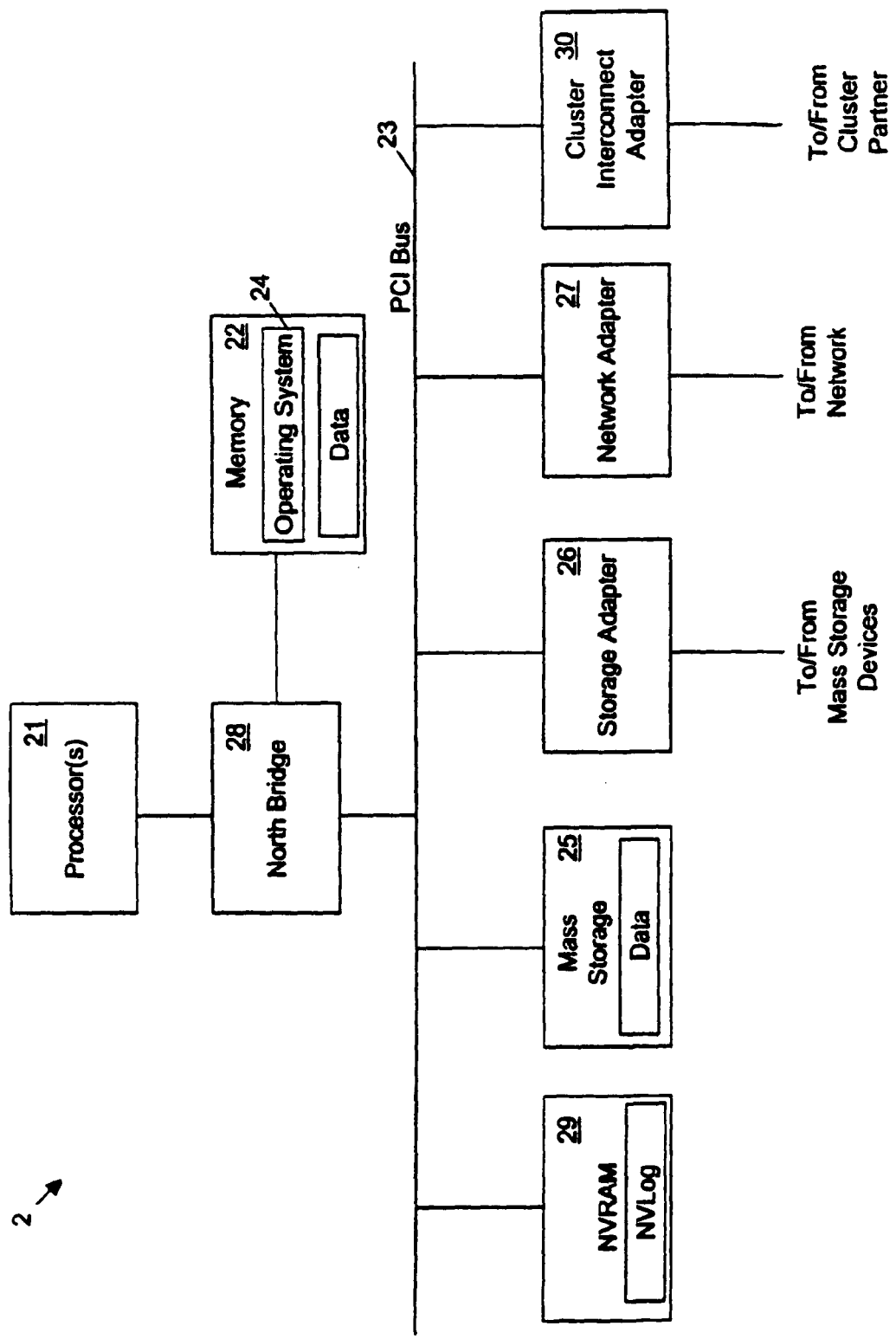
FIG. 2 is a schematic block diagram of a storage server that may be used with one embodiment of the present invention.
Figure 3:
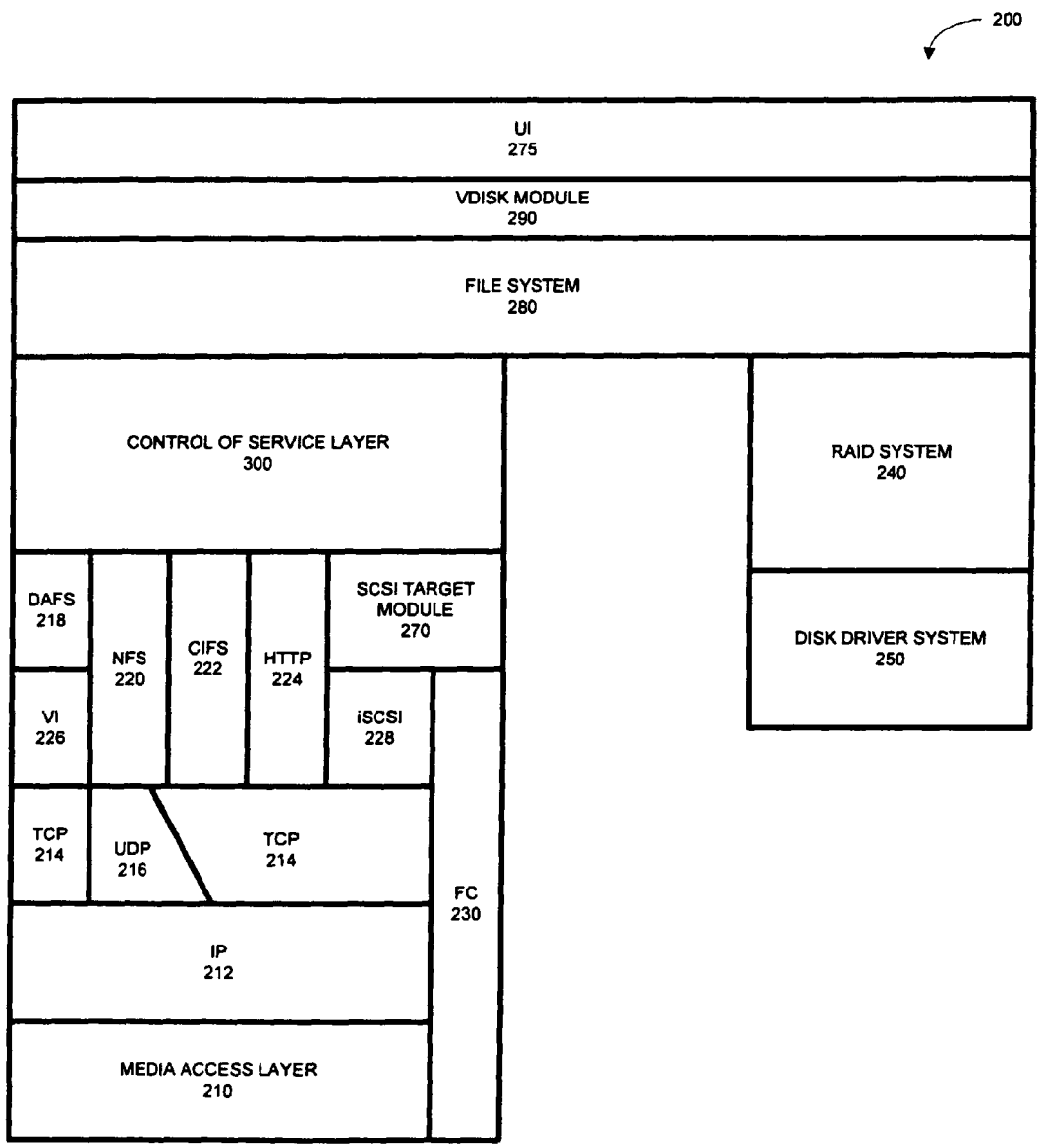
FIG. 3 is a schematic block diagram of a storage operating system that may be used with one embodiment of the present invention.

FIG. 3 is a schematic block diagram of the storage operating system 200—which may be used in place of operating system 24 in FIG. 2—that may be advantageously used with one embodiment of the present invention. The storage operating system 200 comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A virtual interface (VI) layer 226 implements the VI architecture to provide direct access transport (DAT) capabilities, such as remote direct memory access (RDMA), as required by the DAFS protocol 218.

A iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of LUNs to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 is disposed to provide a translation layer of the virtualization system between the block (LUN) space and the file system space, where luns are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements a write anywhere file system having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Figure 4:
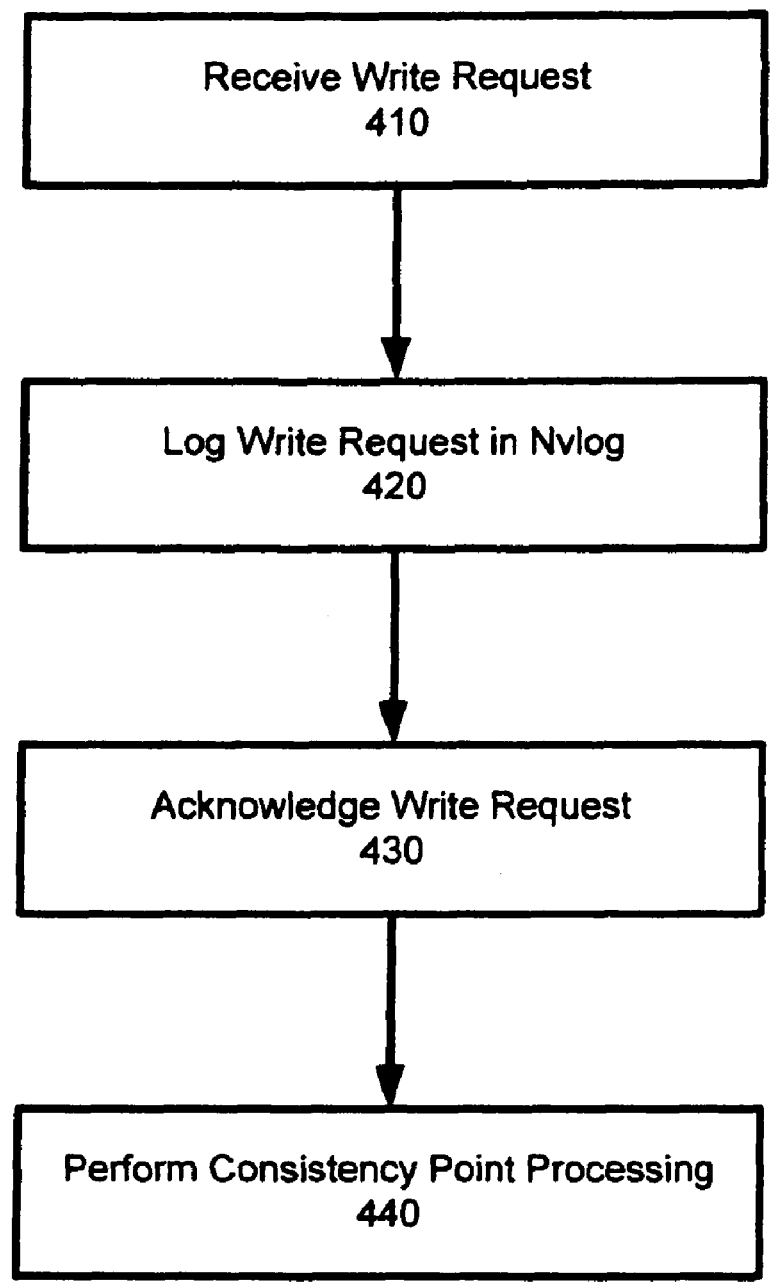
FIG. 4 is a flow diagram of write request processing during normal loads according to one embodiment of the present invention.

Write request processing of the storage server is now described with reference to FIG. 4. The storage server can be similar to the storage server 2 shown in FIG. 2. In block 410, a write request is received via one of the protocols described with reference to FIG. 3, such as NFS. The write request includes the source of the request, a destination for the request, and the data to be written. The request source may be identified as an application, a client, or some other addressable entity. The request source may be identified by one or more Internet Protocol (IP) addresses. The request destination can be a file system, a volume, a virtual volume, or some other type of storage container.

In block 420, the write request is logged in the NVLog, such as the NVLog discussed with reference to FIG. 2. When the write request has been logged, in block 430, the storage server acknowledges the write request to the source of the write request. Then, in block 440, consistency point (CP) processing is performed. The CP processing can be triggered by a timer (e.g., every 5 seconds), by some event (e.g., NVLog running out of space), or a combination of timers and events.

Figure 5:
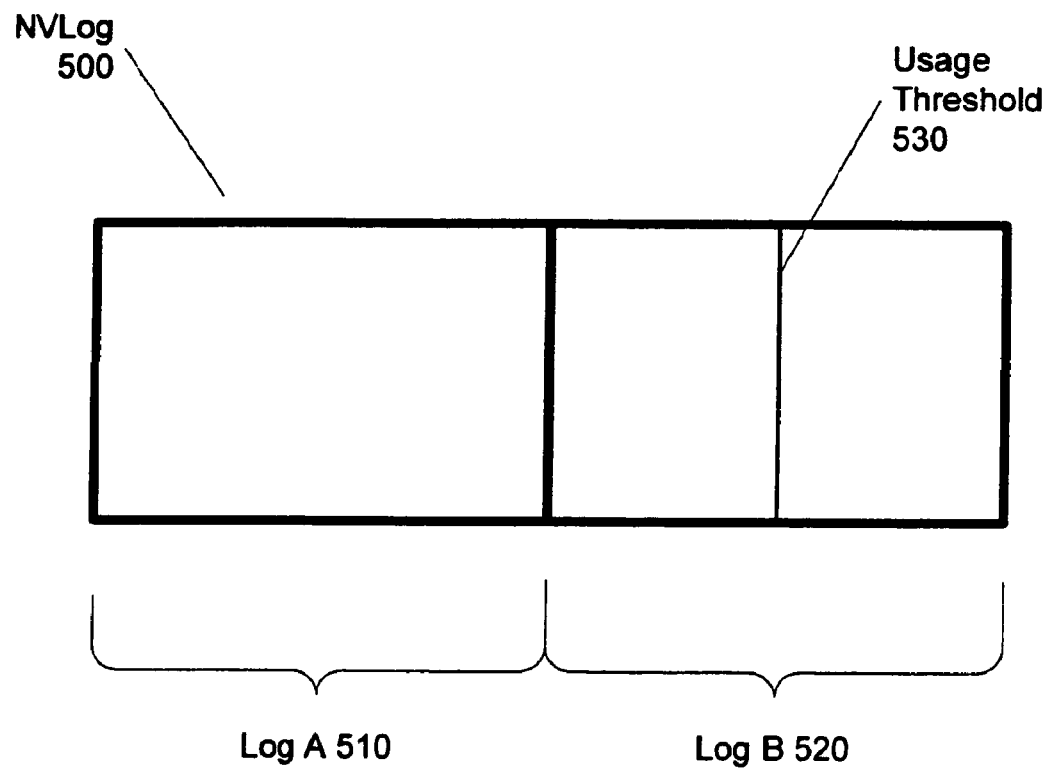
FIG. 5 is a schematic block diagram of an NVLog according to one embodiment the present invention.

One embodiment of the NVLog is now described with reference to FIG. 5. In FIG. 5, the NVLog is divided into two halves labeled log A 510 and log B 520 respectively. When log A 510 is full, the operating system 200 of the storage server 2 initiates CP processing. During CP processing, the write requests logged in log A 510 are written to disk via the file system 280, the RAID system 240, and the disk driver system 250 described with reference to FIG. 3.

CP processing takes time and is a relatively slow operation for the storage server 2. That is, write requests keep arriving while the storage server carries out CP processing. In one embodiment, while log A 510 is in CP processing, incoming write requests are logged in log B 520. When log B 520 fills up, CP processing is performed over log B 520, and incoming write request are logged in log A 510 which was cleared after the CP processing over log A 510 has completed.

However, in a heavy load condition, write requests can come in such quantities that log B 520 fills up before the CP processing over log A 510 completes. This is sometimes referred to as "Back-to-Back CPs." When this happens, write requests cannot be logged until CP processing over log A 510 completes and log A 510 is cleared, causing the client service rate to drop to zero. In one embodiment, the present invention only logs "important" write requests, while blocking all other write requests, under heavy load conditions as determined by one or more specified criteria.

In one embodiment, the control of service layer 300 shown in FIG. 3 is interposed between the protocol layers and the file system 280. The control of service layer 300 is configured to control levels of service based on various service policies. One such policy can control access to the NVLog 500.

In one embodiment, the control of service layer 300 begins to restrict access to the NVLog 500 upon entering a "usage monitor mode." A process for determining whether to enter usage monitor mode is now described with reference to FIG. 6. In block 610, the control of service layer 300 determines whether the storage server 2 is performing CP processing. If the storage server 2 is not performing CP processing, then, in block 620, the service control layer 300 exits usage monitor mode. If the storage server 2 is not in usage monitor mode, then block 620 has no effect and processing continues.

If, however, in block 610 the storage server 2 is found to be performing CP processing, then, in block 630, the service control layer 300 observes whether the open portion of the NVlog 500 has exceeded a usage threshold. Such a usage threshold is illustrated in FIG. 5. Log A 510 is the portion of the NVLog 500 that is in CP processing, and log B 520 represents the open portion of the NVLog 500. Usage threshold 530 represent the threshold that, if exceeded, triggers the entering of usage monitor mode.

Figure 6:
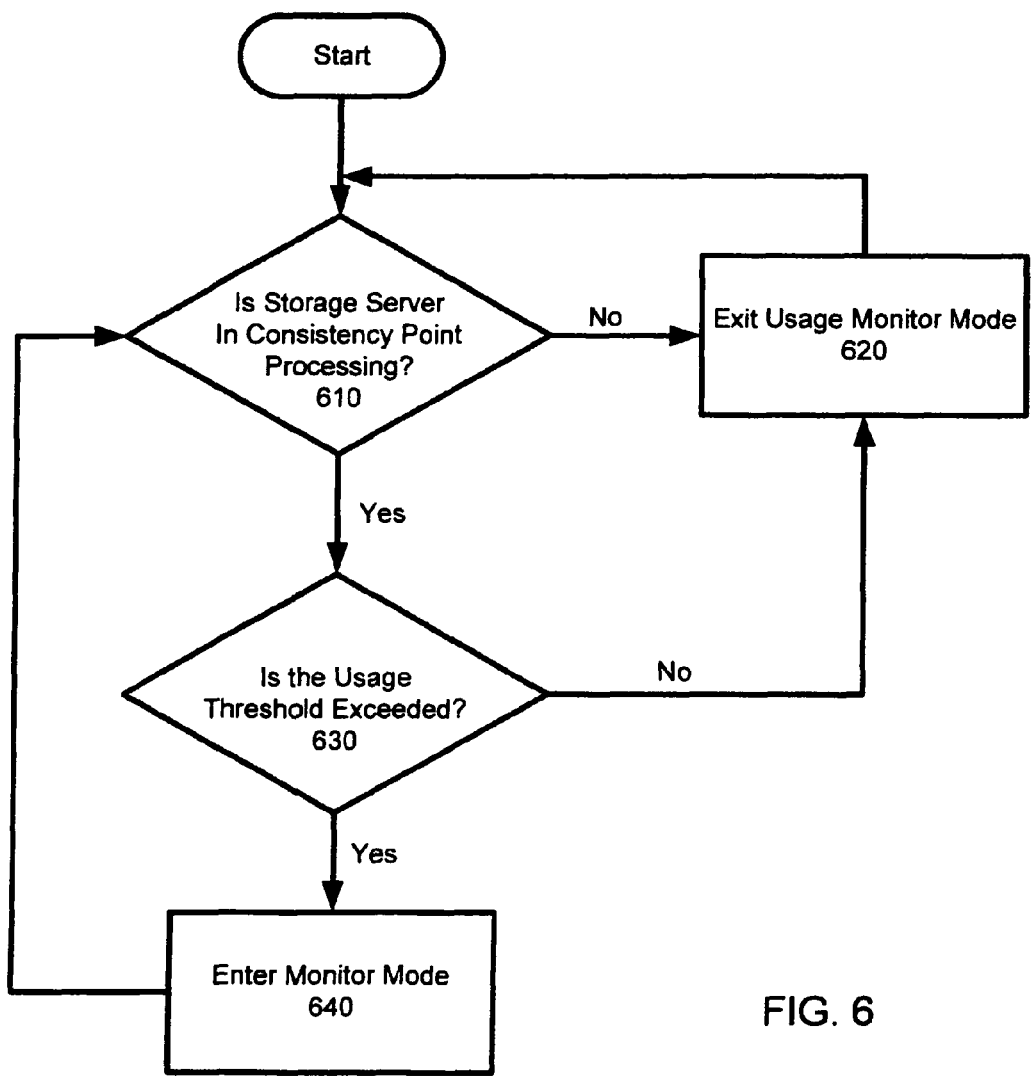
FIG. 6 is a flow diagram of usage monitor mode determination processing according to one embodiment of the present invention.

Thus, in block 630 of FIG. 6, if the usage threshold is not exceeded, then in block 620, the service control layer 300 exits usage monitor mode. Once again, if the storage server 2 is not in usage monitor mode, then block 620 has no effect and processing continues. However, if in block 630 the usage threshold of the open portion of the NVLog 500 is exceeded, then, in block 640, usage monitor mode is entered. If the storage server 2 is already in usage monitor mode, then block 640 has no effect and processing continues.

Figure 7:
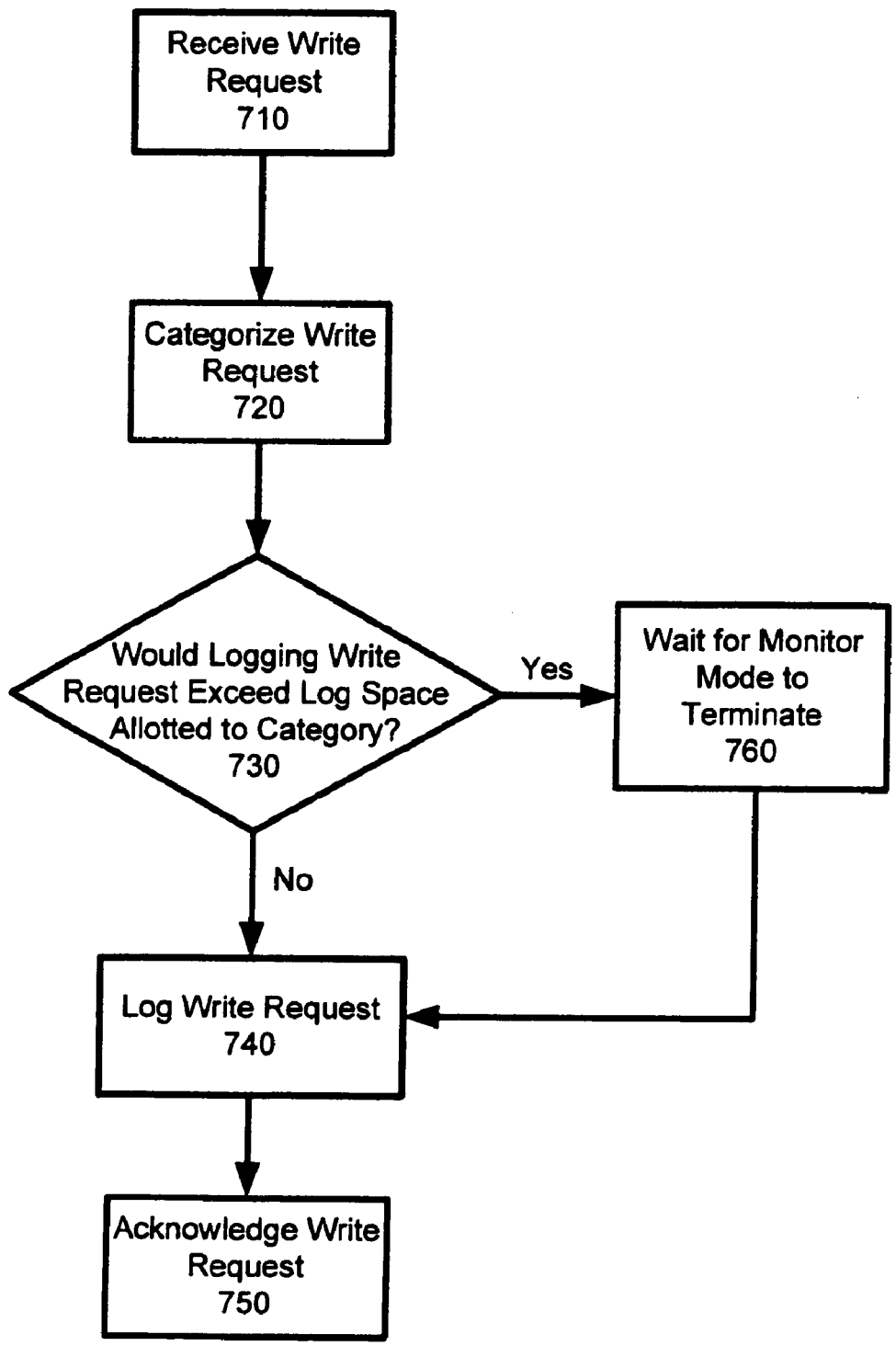
FIG. 7 is a flow diagram of write request processing during usage monitor mode according to one embodiment of the present invention.

In one embodiment, when in usage monitor mode, the service control layer 300 changes the regular processing of write requests described with reference to FIG. 4. One embodiment of write request processing in usage monitor mode is now described with reference to FIG. 7. In block 710 the write request is received from the one of the protocol layers.

In block 720, the write request is categorized. The categorization can be based on the destination of the write request, such as target volume, file system, or other storage container. The categorization can also be based on the source of the write request, such as client or source application. Furthermore, the write request may have a priority key on which categorization can be based, such as "High Priority" and "Low Priority." Any combination of the above categorization schemes is also possible.

In block 730, the control of service layer 300 determines whether logging the received write request would cause the NVLog usage of the category of the write request to exceed an allotted usage. In one embodiment, the control of service layer 300 keeps track of open NVLog usage on a per category basis. For example, 80% of the open portion of the NVLog may be reserved for "High Priority" write requests. Thus, if the received write request is a "Low Priority" request and the "Low Priority" category already is using 20% of the open portion of the NVLog, then logging the new write request would exceed the usage allotment of the category of the received write request.

If, in block 730, the control of service layer 300 determines that logging the received write request would not cause the NVLog usage of the category of the write request to exceed the allotted usage, then the control of service layer 300 allows regular write request processing to continue, and passes the write request to the file system 280, where, in block 740 the write request is logged and then acknowledged in block 750.

However, if in block 730, the control of service layer 300 determines that logging the received write request would cause the NVLog usage of the category of the write request to exceed the allotted usage, then the control of service layer 300 delays the write request, by waiting, in block 760, for usage monitor mode to terminate before allowing the file system 280 to process the write request in blocks 740 and 750.

Figure 8:
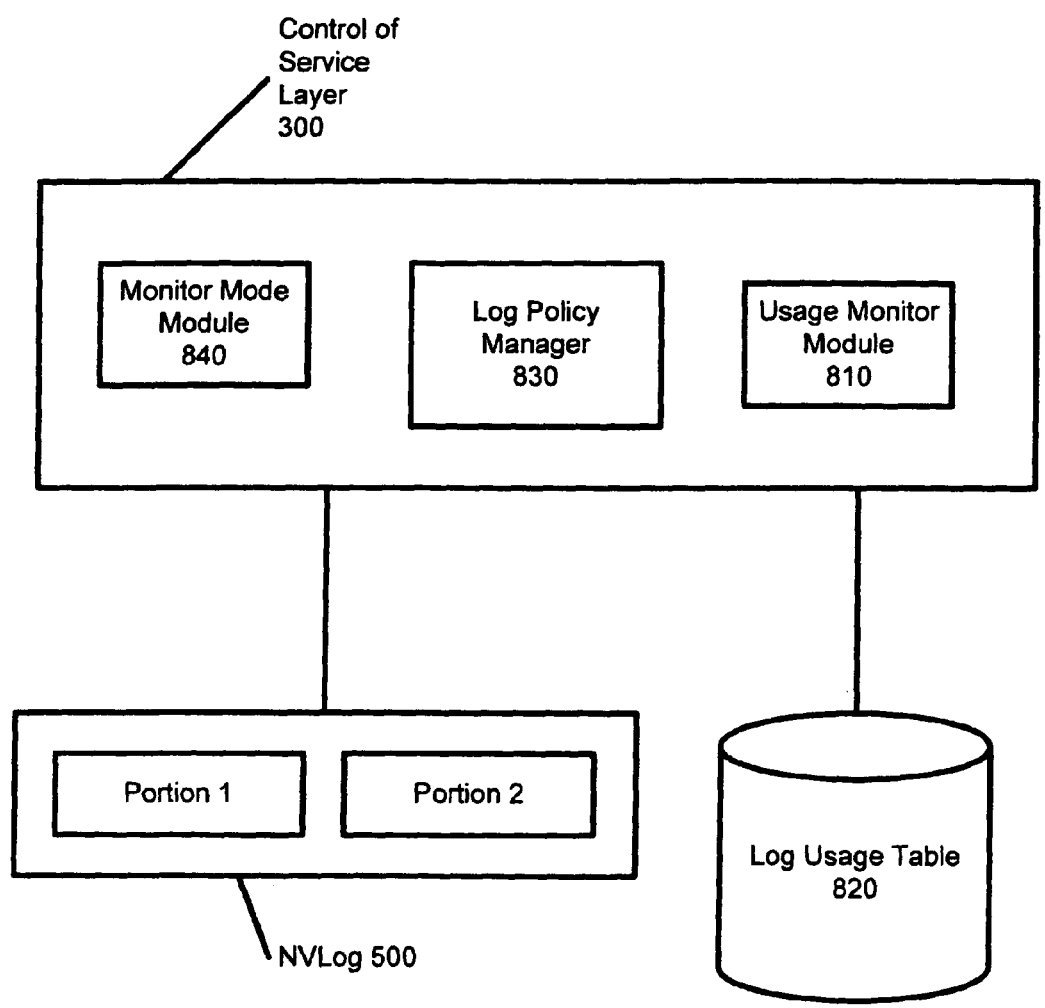
FIG. 8 is a schematic block diagram of a control of service layer according to one embodiment the present invention.

A detailed example is now provided to further clarify the various embodiments of the present invention with reference to FIG. 8. FIG. 8 shows the control of service layer 300 and the NVLog 500. The NVLog 500 is shown as having two portions, Portion 1 and Portion 2 corresponding to log A 510 and log B 520 in FIG. 5.

In FIG. 8, the two portions are shown as separate to emphasize that the two portions can be implemented as two separate logs, or they may be partitioned out of one log. In one embodiment, the two portions may be equal in size, but this is not necessarily so.

In this example, the write requests are categorized on a per volume basis. That is, all write requests to a specific target volume are in the same category. As mentioned above, other categories, such as clients or applications can be used as well.

The control of service layer 300 implements a usage monitor module 810. In one embodiment, the usage monitor module 810 is configured keep statistics of NVLog usage over the open portion of the NVLog 500 on a per volume basis. The "open" portion of the NVLog 500 refers to the portion that is currently being used to log incoming write request.

The usage monitor module 810 may do this by maintaining a log usage table 820, although any other data structure may be used. The log usage table 810 may be implemented as a database, a spreadsheet, or some other data storage technique. It can be stored on the server in system memory 22, mass storage 25, or one some network storage device accessible by the storage server 2 via the storage adapter 26. An example log usage table 810 is now provided as Table 1:

TABLE 1

| Category | Allotted Usage | Actual Usage |
| --- | --- | --- |
| Volume 1 | 10 Percent | 10 Percent |
| Volume 2 | 40 Percent | 25 Percent |
| Volume 3 | 30 Percent | 25 Percent |
| Volume 4 | 20 Percent | 20 Percent |

In this simplified example, the storage server 2 organizes files in four volumes numbered 1-4. The allotted usage column of Table 1 represents the percentage of the open portion of the NVLog 500 that each Volume is allowed to use during heavy loads. The allotted usage may be expressed in other ways as well, such as a total number of bytes (or other units of data) that each volume can occupy on the NVLog 500. The allotted usage specifications can be user configurable. An administrator can access and edit the allotted usage column of log usage table via the user interface 275 described with reference to FIG. 3.

Referring again to FIG. 8, the control of service layer 300 includes a monitor mode module 840. In one embodiment, the monitor mode module 840 implements the process described with reference to FIG. 6 to determine whether the log policy manager 830 should implement usage monitor mode. Usage monitor mode can be entered by the exceeding of a usage threshold of Portion 2 of the NVLog 500 when Portion 1 is in CP processing.

The usage threshold is 50 percent usage of the open portion in one embodiment, but any other usage level may be used. Furthermore, the usage threshold may be user configurable. In another embodiment, the monitor mode module 840 can trigger monitor mode any time when CP processing is taking place over a portion—such as Portion 1—of the NVLog 500, without implementing a usage threshold.

The log policy manager 830 is responsible for deciding which write requests are allowed to be logged when the monitor mode module 840 triggers usage monitor mode. Referring again to the example log usage table 820 shown in Table 1, it is assumed for the purpose of this example, the CP processing is being performed on the write requests logged in Portion 1 of the NVLog 500. Furthermore, it is assumed that the usage threshold of Portion 2 (the open portion of the NVLog 500) is 70 percent.

In this example, the actual usage column of the log usage table 820 shows that Portion 2 is 80 percent full. Thus, the monitor mode module 820 would trigger usage monitor mode, since Portion 1 is in CP processing, and usage on Portion 2 exceeds 70 percent.

The next write request arriving in this example is destined for Volume 2. In usage monitor mode, the log policy manager 830 enforces the allotments specified in the log usage table. Thus, Volume 2 is currently using 25 percent of Portion 2 and it is allowed to use 40 percent. The received write request would increase Volume 2's usage to 30 percent. Since 30 percent would not exceed 40 percent, the log policy manager would allow this write request to be logged.

The next write request arriving in this example is destined for Volume 4. Volume 4 is currently using 20 percent of Portion 2 and it is allowed to use 20 percent. The received write request would increase Volume 4's usage to 22 percent. Since 22 percent would exceed 20 percent, the log policy manager would block this write request until usage monitor mode terminates.

As explained above, the log policy manager 830 can utilize a log usage table 820 with categories other than volumes. Usage may be allotted on a per client or per application basis instead. Alternatively, another category, such as "mission critical database" could be used, or a combination of the categorizations set fourth above.

The NVLog 500 has been described above as having two halves or two portions. However, the NVLog 500 may be divided into more than two partitions. Furthermore, the various partitions of the NVLog can be implemented as separate NVLogs, not necessarily of equal size. Similarly, partitions of a single NVLog, such as Log A 510 and Log B 520 in FIG. 5 and Poritions 1 and 2 in FIG. 8, do not need to be equal in size.

Thus, a method and system to control NVLog access have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

It will be noted that the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

What is claimed is:

1. A method, comprising:
    receiving a write request from a client at a storage server;
    determining that a first portion of a non-volatile log (NVLog) is in consistency point processing;
    classifying the received write request into a category, wherein the category is one of a plurality of categories of write requests to be logged in a second portion of the NVLog;
    determining if presently logging the received write request in the second portion of the NVLog would exceed a threshold for write requests of the classified category in the second portion of the NVLog when the first portion of the NVLog is in consistency point processing;

if the write request would exceed the threshold, delaying the logging of the received write request until the first portion of the NVLog completes the consistency point processing; and if the write request would not exceed the threshold, logging the received write request in the second portion of the NVLog.

2. The method of claim 1, wherein the category of the write request comprises a target volume of the write request.

3. The method of claim 1, wherein the category of the write request comprises a client that issued the write request.

4. The method of claim 1, wherein the category of the write request comprises an application that issued the write request.

5. The method of claim 1, wherein the category of the write request comprises a priority level associated with the write request.

6. The method of claim 1, wherein the threshold specifies how much of the NVLog can be occupied by write requests associated with the category.

7. A storage server, comprising:
 a network adapter configured to connect the storage server to a network and to receive a write request from a client machine also connected to the network; and
 a memory storing an operating system, wherein the operating system implements a control of service layer, the control of service layer
  to determine that a first portion of a non-volatile log (NVLog) is in consistency point processing,
  to categorize the received write request into one of a plurality of categories to be logged in a second portion of the NVLog,
  to determine if presently logging the received write request in the second portion of the NVLog would to exceed threshold for write requests of the category in the second portion of the NVLog when the first portion of the NVLog is in consistency point processing,
  if the write request would exceed the threshold, to delay the logging of the received write request until the first portion of the NVLog completes the consistency point processing, and
  if the write request would not exceed the threshold, to log the received write request in the second portion of the NVLog.

8. The storage server of claim 7, wherein the control of service layer further comprises a usage monitor module to implement a log usage table, wherein the log usage table stores usage statistics over the second portion of the NVLog for each of the plurality of categories.

9. The storage server of claim 8, wherein the determination whether presently logging the received write request in the NVLog would cause the NVLog usage of the category of the write request to exceed the threshold includes comparing the threshold with the usage statistic associated with the category of the write request.

10. The storage server of claim 7, wherein the category of the write request comprises a target volume of the write request.

11. The storage server of claim 7, wherein the category of the write request comprises the client machine.

12. The storage server of claim 7, wherein the category of the write request comprises an application executing on the client machine.

13. The storage server of claim 7, wherein the category of the write request comprises an application type associated with the write request.

* * * * *